United States Patent [19]
Brown et al.

[11] Patent Number: 4,866,883
[45] Date of Patent: Sep. 19, 1989

[54] VEHICLE DOOR SEPARABLE FOR ACCESS TO DOOR HARDWARE

[75] Inventors: David L. Brown, Pontiac; James A. Crandall, Bloomfield Hills; Brian A. Gilliard, Utica, all of Mich.

[73] Assignee: General Motors Corporation, Detroit, Mich.

[21] Appl. No.: 179,548

[22] Filed: Apr. 8, 1988

[51] Int. Cl.⁴ .............................................. B60J 5/04
[52] U.S. Cl. .......................................... 49/502; 49/65; 49/166; 49/348; 296/146; 296/188; 296/202
[58] Field of Search ................ 49/502, 166, 348, 349, 49/350, 351, 352, 353, 65, 67; 296/146, 202, 188

[56] References Cited

U.S. PATENT DOCUMENTS

| | | | |
|---|---|---|---|
| 1,665,294 | 4/1928 | Bennger | 49/166 |
| 2,707,320 | 5/1955 | Fish | 49/502 X |
| 4,702,040 | 10/1987 | Hellriegel | 49/502 |

FOREIGN PATENT DOCUMENTS 2149726 6/1985 United Kingdom ................ 296/146

Primary Examiner—James R. Brittain
Attorney, Agent, or Firm—Charles E. Leahy

[57] ABSTRACT

The door inner and outer panels are detachably attached to one another to permit separation to access the space therebetween containing the door hardware. A device mounts the door inner panel and the door outer panel on the vehicle body for independent hinging movement so that the panels move between door open and door closed position in unison with one another when the panels are attached, and the detachment of the panels from one another permits the outer panel to swing away from the inner panel to provide unobstructed access to the door hardware mounted in the space between the panels. The inner and outer panels may be constructed of molded plastic and with one panel having a receptacle receiving the door guard beam and the other panel having an integral molded structure receiving the receptacle upon attachment of the panels together so that the door guard beam becomes effectively coupled with both of the panels. Integrally molded innerlocks are preferably provided on the molded inner and outer panels to mate with one another when the panels are attached together. Attachment of the panels is provided by a plurality of fasteners which extend between the integrally molded innerlock features.

5 Claims, 3 Drawing Sheets

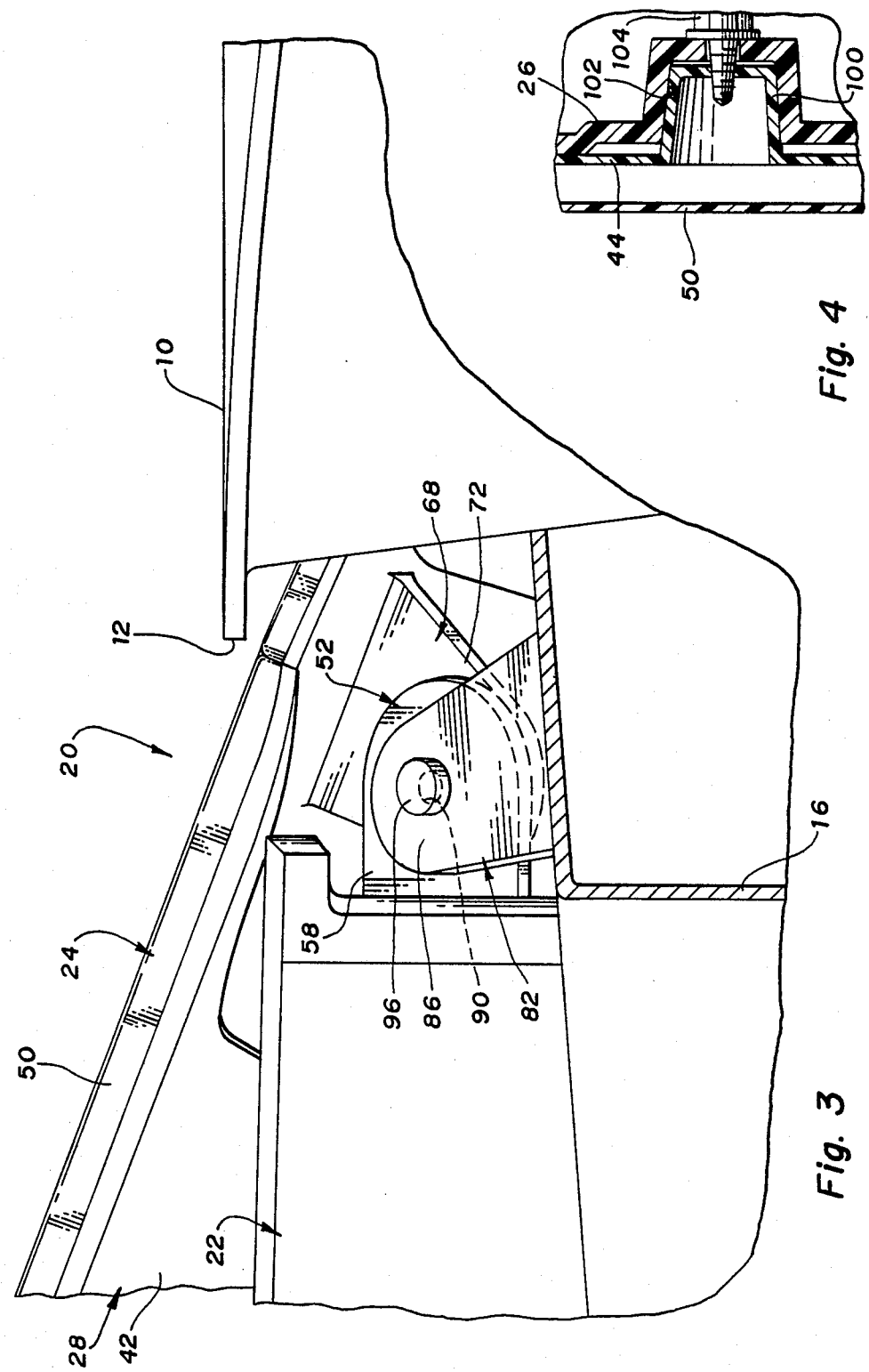

VEHICLE DOOR SEPARABLE FOR ACCESS TO DOOR HARDWARE

The invention relates to a molded plastic vehicle door and more particularly provides inner and outer door panels hinged separately on the vehicle body so that the inner and outer panels can be pivotally separated to facilitate access to door hardware mounted inside the door.

BACKGROUND OF THE INVENTION

Motor vehicle doors typically comprise inner and outer panels which are joined together and define a space therebetween for housing door hardware such as the window regulator and door latch. The inner panel conventionally has one or more openings through which the door hardware may be installed and repaired. After the door hardware is installed, a decorative trim panel is attached to the door inner panel to conceal the inner workings of the door.

In order to service the door, the decorative trim panel must be removed and the repair person reaches through the access openings to diagnose and repair the door hardware. The door structure typically includes a door guard beam which extends longitudinally inside the door and may complicate the installation and repair of the door hardware.

The door inner and outer panels may be constructed of stamped sheet metal or molded plastic, or a combination thereof.

It would be desirable to provide a vehicle door construction providing improved access to the door hardware mounted inside the door.

SUMMARY OF THE INVENTION

According to the invention the door inner panel and the door outer panel are detachably attached to one another so that the inner and outer panels may be separated to facilitate access to the space therebetween containing the door hardware. A hinge device mounts the door inner panel and the door outer panel on the vehicle body for independent hinging movement so that the panels move between door open and door closed position in unison with one another when the panels are attached, and the detachment of the panels from one another permits the outer panel to swing away from the inner panel and provide unobstructed access to the door hardware mounted in the space between the inner and outer panels. The inner and outer panels may be constructed of molded plastic, with one panel having a receptacle receiving the door guard beam and the other panel having an integral molded structure receiving the receptacle upon attachment of the panels together so that the door guard beam becomes effectively coupled with both of the panels. Integrally molded innerlocks are preferably provided on the molded inner and outer panels to mate with one another when the panels are attached together. Attachment of the panels is preferably provided by a plurality of fasteners which extend between the integrally molded innerlock features.

Accordingly, the objects, features, and advantages of the invention resides in a vehicle door construction in which the inner and outer door panels are detachably separable from one another and yet hinged for independent movement relative one another so that detaching of the panels and relative hinging movement relative therebetween opens the space between the panels to facilitate installation maintenance of the door hardware located therein.

Another object, feature and advantage of the invention resides in a vehicle door comprised of molded plastic inner and outer panels with one of the panels having an integrally molded receptacle receiving a door guard beam which becomes captured between the two panels when the panels are attached together.

BRIEF DESCRIPTION OF THE DRAWINGS

These and other features of the objects, features and advantages of the invention will become apparent upon consideration of the description of the preferred embodiment and the appended drawings in which:

FIG. 3 is a perspective view showing the hinge arrangement hingedly mounting the inner and outer panels on the vehicle body.

FIG. 4 is a section elevation view showing a fastener separately connecting the inner and outer panels.

DESCRIPTION OF THE PREFERRED EMBODIMENT

Figure 1:
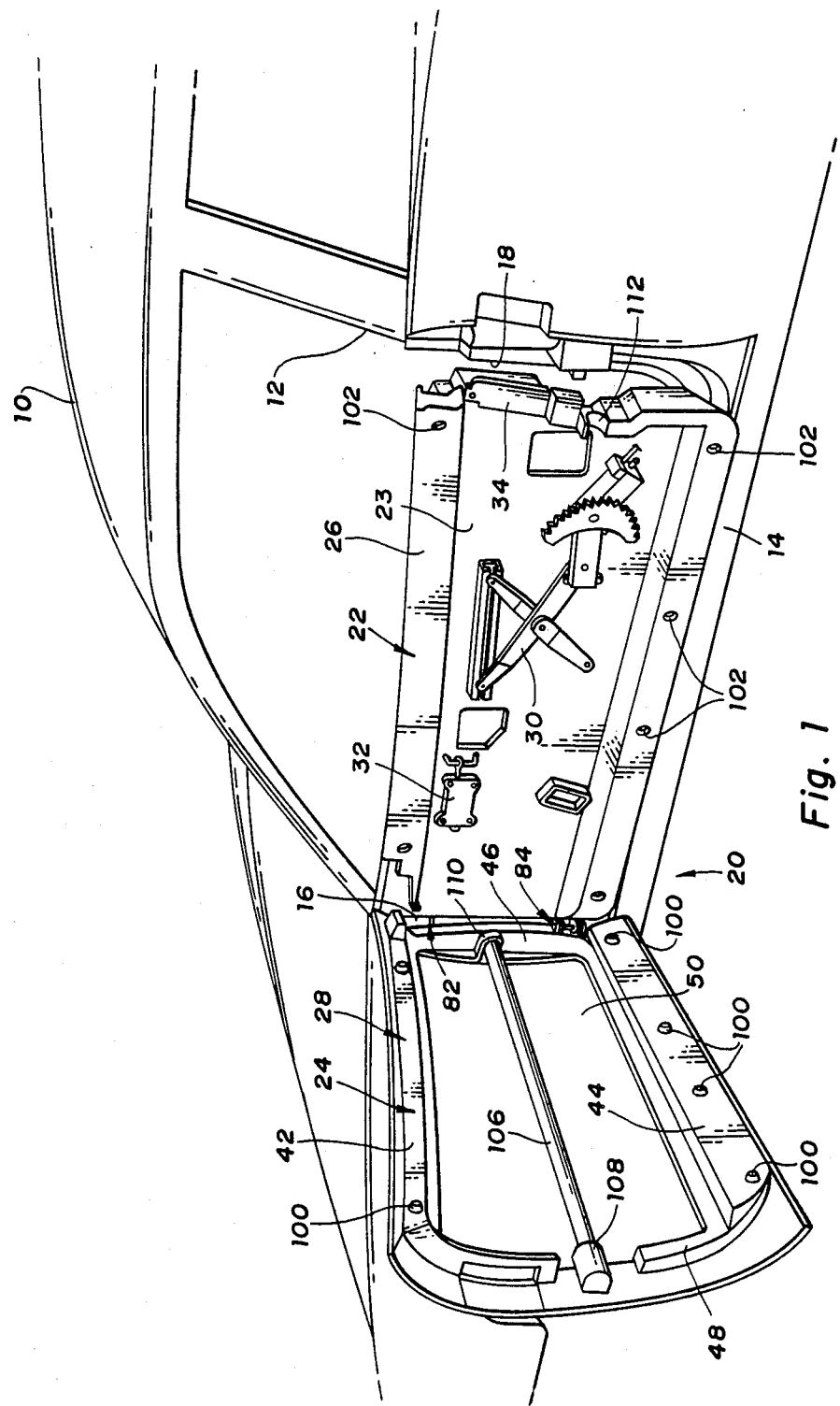
FIG. 1 is a perspective view of a vehicle body having a door according to the present invention and shown with the door outer panel separated from the door inner panel and hingedly moved to an open position facilitating access to the door hardware mounted inside the door.

Referring to FIG. 1, there is shown a vehicle body generally indicated at 10 and having a door opening 12 defined in part by a rocker panel structure 14, a hinge pillar 16 at the forward end of the door opening and a latch pillar 18 at the rearward end of the door opening. A door 20 for selectively opening and closing the door opening 12 is comprised of a door inner panel 22 and a door outer panel 24. The door inner panel 22 is constructed of molded plastic, preferably by reaction injection molding or sheet molding compound. The inner panel 22 is comprised of a generally planar central portion 23 surrounded by a peripheral flange structure 26 extending around the top, bottom and hinge pillar margins of the planar portion 23. Flange structure 26 gives the door inner panel a substantial rigidity and strength. As seen in FIG. 1, door hardware, such as the window regulator mechanism 30, door latch release handle 32, and the door latch 34 are mounted on the outside surface of the door inner panel 22.

Figure 2:
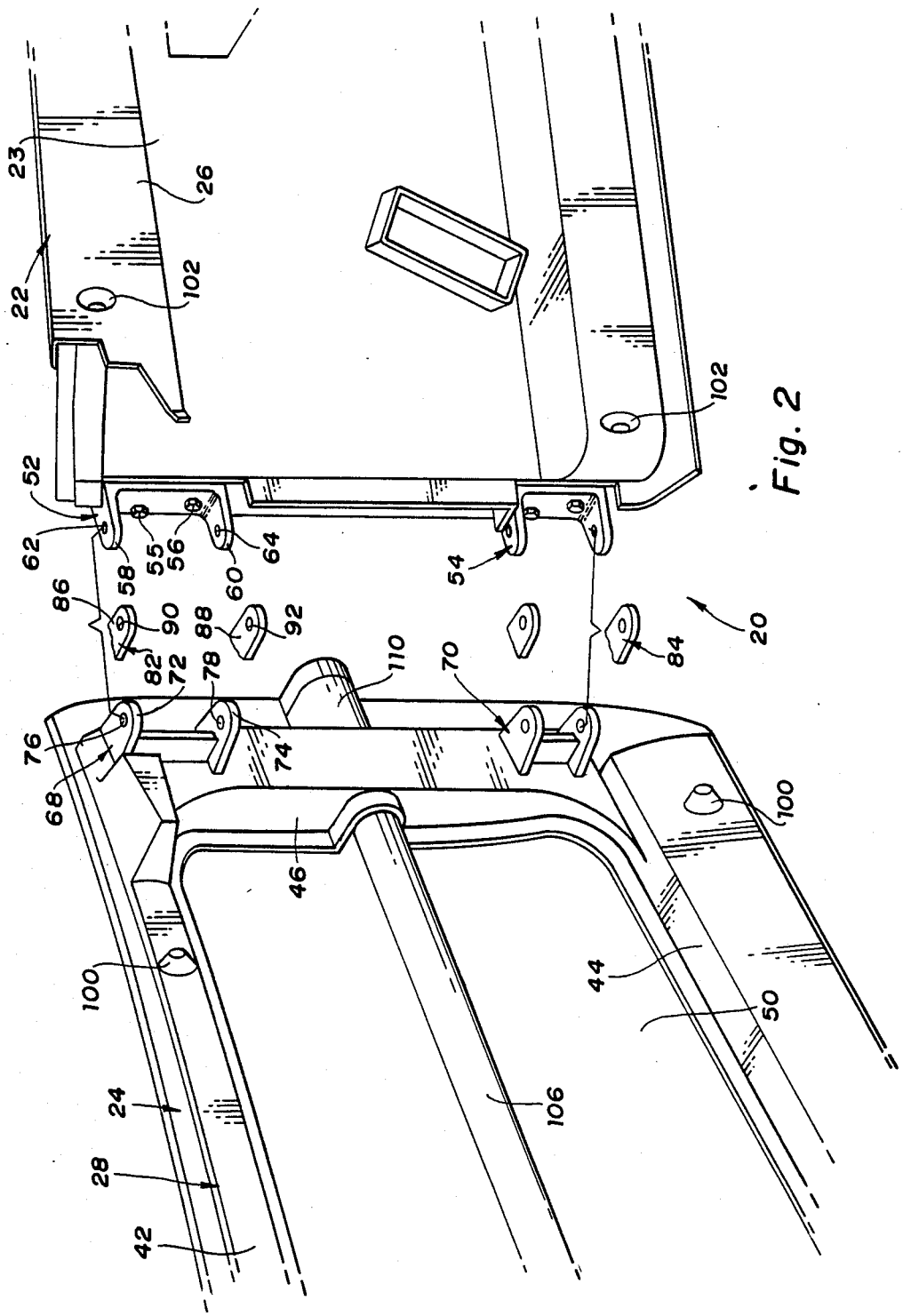
FIG. 2 is an exploded view showing the door inner panel and the door outer panel having hinge elements for hingedly mounting the inner and outer panels relative one another.

The door outer panel 24, as best seen in FIG. 2, is comprised of two separately molded plastic parts. A reinforcement member 28 is generally rectangular ring in configuration including an upper flange structure 42, lower flange structure 44, a forward flange structure 46, and a rearward flange structure 48. The door outer panel 24 also includes a molded plastic outer skin member 50 which is adhesively or otherwise bonded to the reinforcement member 28 and defines the outer surface of the door 20.

The door inner panel 22 and outer panel 24 are each hingedly mounted on the vehicle body hinge pillar 16. As best seen in FIG. 2, the inner panel 22 carries an upper hinge bracket 52 and a lower hinge bracket 54. The upper hinge bracket 52 is a sheet metal stamping attached to the inner panel 22 by bolts 55 and 56 and includes an upper hinge bracket 58 and a lower hinge bracket 60 vertically spaced from one another. The upper hinge bracket and lower hinge bracket 60 have coaxially aligned pivot apertures 62 and 64 provided therein. The lower hinge bracket 54 is similarly constructed.

The outer door panel 24 carries an upper hinge bracket 68 and a lower hinge bracket 70. The upper hinge bracket 68 is integrally molded with the reinforcement 24 and includes an upper hinge arm 72 and a lower hinge arm 74 which respectively have aligned pivot apertures 76 and 78. The lower hinge bracket 70 of the outer panel 24 is similarly configured. The hinge arms 72 and 74 are vertically spaced apart although to a lesser dimension than the vertical spacing between the hinge arms 58 and 60 of the upper hinge bracket 52 so that the hinge bracket 68 of the outer panel may be tightly nested within the hinge bracket 52 of the inner panel 22.

The inner panel 22 and outer panel 24 are mounted on the hinge pillar 16 by an upper hinge bracket 82 and lower hinge bracket 84 carried by the hinge pillar 16. As best shown in FIG. 3, the upper hinge bracket 82 includes an upper hinge arm 86, and also a lower hinge arm 88, not shown. The upper and lower hinge arms 86 and 88 are shown in phantom line in FIG. 2. The upper and lower hinge arms 86 and 88 of the hinge bracket 82 are vertically spaced from one another at a greater vertical spacing than the arms 58 and 60 of the door inner hinge bracket 52 so that the hinge arms 86 and 88 will closely capture the door inner hinge bracket 52. Furthermore, the hinge arms 86 and 88 have pivot pin apertures 90 and 92 which align with the pivot pin apertures of the hinge brackets 52 and 68. Accordingly, as best seen in FIG. 3, the installation of a hinge pivot pin 96 through the aligned apertures of the body hinge bracket 82, the door inner hinge bracket 52, and the door outer hinge bracket 68, will mount the inner and outer panels for hinging movement on the vehicle body.

Referring to FIG. 1, it is seen that the door outer panel 24 is hinged open away from the inner panel 22 to expose the window regulator 30, door latch assembly and the door latch 34 for installation and/or maintenance. The hinges enable the door outer panel 24 to be pivoted inwardly to closely overlie the door inner panel 26. Detachable attachments are provided to connect the door inner panel 22 and the door outer panel 24. As seen in FIGS. 1 and 2, the reinforcement member 28 of the door outer panel 24 includes a plurality of integrally molded conical projections 100 which are aligned to mate and engage into a plurality of conical depressions 102 integrally molded in the reinforcing flange structure 26 of the door inner panel 22. When the outer panel 24 is swung into overlying engagement with the inner panel 22, the conical projections 100 extend in close fitting relationship with the conical depressions 102 of the door inner panel to substantially rigidify and strengthen the vehicle door 20. As shown in FIG. 4, the inner panel 22 and outer panel 24 are attached together by a plurality of fasteners, preferably threaded screws 104, which are installed from inside the car, through the conical depressions 102 and into the conical projections 100 of the outer panel 24. After these screws are installed, a decorative trim panel is attached to the inside of the vehicle door 20. These threaded fasteners may be removed when the motor vehicle is in customer use in order to permit a repairman to access and repair the door hardware simply by swinging the door outer panel 24 outwardly to the position of FIG. 1 thereby exposing the door hardware to convenient access.

Referring again to FIG. 1, it is seen that the vehicle outer panel 24 carries the door guard beam structure 106. The guard beam structure 106 is a structural member of metal or reinforced plastic construction such as a tube. As best seen in FIG. 1, receptacles 108 and 110 are integrally molded into the front wall 46 and rear wall 48 of the reinforcement member 28 to conveniently capture the door guard beam structure 106 on the reinforcement member 28. Furthermore, as seen in FIG. 1, the door inner panel 20 has an integrally molded cylindrical depression 112 in the peripheral flange structure 26 which is aligned with the receptacle 108 to closely capture and receive the receptacle 108 therein. Thus, when the door outer panel 24 is swung to its normal position engaging the door inner panel 22, the guard beam becomes effectively coupled with both the outer panel 24 and the inner panel 22.

Thus it is seen that the invention provides a new and improved vehicle door construction which particularly enhances access to the door hardware contained inside the vehicle door for both vehicle original equipment assembly and aftermarket repairs. By simply removing the plurality of screws 104, the outer panel 24 is swung away from the inner panel 22 exposing the door mounted hardware. It will be understood that the door mounted hardware may be mounted on either the inside panel or the outside panel. Furthermore, it will be understood that the construction of this invention is particularly suited to molded plastic inner and outer panels but may be equally applied to inner and outer panels of stamped metal construction.

The embodiments of the invention in which an exclusive property or privilege is claimed are defined as follows:

1. A vehicle door adapted for hinged mounting upon a vehicle body and carrying door hardware such as a window regulator and door latch, comprising:

a door inner panel;

a door outer panel adapted to overlie the inner panel and define a space therebetween for containing the door hardware;

a plurality of fastening means detachably fastening the inner and outer panels together and enabling detachment and separation of the panels to permit access to the door hardware;

first hinge means hingedly mounting the inner panel on the vehicle body and second hinge means hingedly mounting the outer panel on the vehicle body whereby the panels are mounted on the body for unitary movement between door open and door closed positions when the panels are fastened together, and the panels are hinged for movement independent of one another when the panels are detached from one another;

said door hardware being mounted on one of the panels;

and a door guard beam carried by the other panel so that the hinged separation of the panels upon detachment from one another carries the door guard beam away from the door hardware to facilitate access to the door hardware.

2. A vehicle door adapted for hinged mounting upon a vehicle body and carrying door hardware such as a window regulator and door latch, comprising:

a door inner panel;

a door outer panel adapted to overlie the inner panel and define a space therebetween for the door hardware;

a door hinge arm mounted on the vehicle body and providing a hinge axis for hingedly mounting the door on the vehicle body;

first hinge means associated with the door inner panel and hingedly mounting the door inner panel on the door hinge arm for pivotal movement about the hinge axis;

second hinge means associated with the door outer panel and hingedly mounting the door outer panel on the door hinge arm for pivotal movement about the hinge axis;

and means detachably attaching the inner and outer panels together for unitary movement between door open and door closed positions when the panels are attached together and enabling detachment of the panels from one another for independent hinging movement about the hinge axis and separation from one another whereby access is provided to the door hardware.

3. The door of claim 2 in which the door inner panel and the door outer panel each have a plurality of integrally molded interlocking features arranged in mating relation with each other to establish the panels in force transmitting connection with one another to provide a stable door construction.

4. The door of claim 3 in which the means detachably attaching the inner and outer panels together comprises a plurality fasteners installed between the integrally molded interlocking features of the inner panel and outer panel.

5. A vehicle door adapted for hinged mounting upon a vehicle body carrying door hardware including a window regulator and door latch, comprising:

a door inner panel of molded plastic;

a door outer panel including a molded plastic reinforcement member covered by a molded plastic outer skin member, said door outer panel adapted to engage and overlie the inner panel and define a space therebetween for the door hardware;

means detachably attaching the inner and outer panels together and enabling detachment and separation of the panels from one another;

one of the panels having a receptacle molded therein for receiving and mounting a door guard beam member on the one panel, said receptacle projecting toward the other panel;

said other panel having an integrally molded structure for receiving the receptacle of the one panel so that the guard beam becomes effectively coupled with both of the panels when the inner and outer panels are attached together, and said door hardware being mounted on the other panel so that the detachment and separation of the panels causes the one panel mounting the door guard beam to carry the door guard beam away from the door hardware to facilitate access to the door hardware.

* * * * *